(12) United States Patent
Nakatsuka et al.

(10) Patent No.: US 8,710,712 B2
(45) Date of Patent: Apr. 29, 2014

(54) VIBRATION POWER GENERATOR AND VIBRATION POWER GENERATION DEVICE, AND COMMUNICATION DEVICE AND ELECTRONIC EQUIPMENT WITH VIBRATION POWER GENERATION DEVICE

(71) Applicant: Panasonic Corporation, Osaka (JP)

(72) Inventors: Hiroshi Nakatsuka, Osaka (JP); Yasuyuki Naito, Osaka (JP); Keiji Onishi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/984,648

(22) PCT Filed: Feb. 13, 2013

(86) PCT No.: PCT/JP2013/000779
§ 371 (c)(1),
(2), (4) Date: Aug. 9, 2013

(87) PCT Pub. No.: WO2013/132753
PCT Pub. Date: Sep. 12, 2013

(65) Prior Publication Data
US 2014/0077657 A1 Mar. 20, 2014

(30) Foreign Application Priority Data
Mar. 7, 2012 (JP) .................................. 2012-050427

(51) Int. Cl.
*H02N 1/00* (2006.01)
*G03B 3/10* (2006.01)
*G03B 13/34* (2006.01)

(52) U.S. Cl.
CPC ................ *H02N 1/00* (2013.01); *H02N 1/002* (2013.01); *H02N 1/006* (2013.01); *G03B 3/10* (2013.01); *G03B 13/34* (2013.01)
USPC .............. 310/309; 310/300; 318/116; 396/75

(58) Field of Classification Search
CPC ......... H02N 1/00; H02N 1/002; H02N 1/006; G03B 3/10; G03B 13/34
USPC .................................................. 310/300, 309
IPC .......................... H02N 1/00; G03B 3/10, 13/34
See application file for complete search history.

(56) References Cited

U.S. PATENT DOCUMENTS 8,089,194 B2   1/2012   Naruse et al.
8,102,097 B2   1/2012   Naruse et al.
(Continued)

FOREIGN PATENT DOCUMENTS

JP       2005-529574       9/2005
(Continued)

OTHER PUBLICATIONS

International Search Report (ISR) issued Apr. 9, 2013 in International (PCT) Application No. PCT/JP2013/000779.
(Continued)

*Primary Examiner* — John K Kim
(74) *Attorney, Agent, or Firm* — Wenderoth, Lind & Ponack, LLP.

(57) ABSTRACT

A vibration power generator is provided that increases output power by improving the electrostatic capacitance when the area of the overlap between electret electrodes and counter electrodes is maximum while having the function of limiting the spread of the electric field from the electret electrodes. The vibration power generator is provided with: a first substrate and a second substrate configured so as to be relatively movable while keeping a condition of being separated so as to be opposed to each other; a first electrode formed on the first substrate; a second electrode formed on the second substrate so as to be opposed to the first electrode; and a third electrode formed in a region different from the first electrode on the first substrate, either one of the first electrode and the second electrode includes a film holding a charge, and when an overlap between the first electrode and the second electrode is minimum, the third electrode is grounded, and when the overlap between the first electrode and the second electrode is maximum, the third electrode is open.

10 Claims, 13 Drawing Sheets

(56) References Cited

U.S. PATENT DOCUMENTS

| | | |
|---|---|---|
| 8,212,450 B2 | 7/2012 | Mabuchi et al. |
| 2001/0028203 A1* | 10/2001 | Kasahara et al. ............. 310/309 |
| 2002/0050764 A1* | 5/2002 | Koga et al. .................... 310/309 |
| 2003/0209952 A1* | 11/2003 | Akiba et al. .................. 310/309 |
| 2004/0007877 A1 | 1/2004 | Boland et al. |
| 2004/0012300 A1* | 1/2004 | Kasahara et al. ............. 310/309 |
| 2004/0016120 A1 | 1/2004 | Boland et al. |
| 2004/0032184 A1* | 2/2004 | Koga et al. .................... 310/309 |
| 2004/0066113 A1* | 4/2004 | Kasahara et al. ............. 310/309 |
| 2004/0212275 A1* | 10/2004 | Koga et al. .................... 310/309 |
| 2005/0253481 A1* | 11/2005 | Koga et al. .................... 310/309 |
| 2006/0097672 A1* | 5/2006 | Koga et al. .................... 318/116 |
| 2009/0058224 A1* | 3/2009 | Murayama et al. ........... 310/309 |
| 2010/0052469 A1 | 3/2010 | Naruse et al. |
| 2010/0109472 A1 | 5/2010 | Naruse et al. |
| 2011/0316384 A1 | 12/2011 | Nakatsuka et al. |
| 2012/0181897 A1 | 7/2012 | Masaki et al. |
| 2012/0306313 A1 | 12/2012 | Nakatsuka et al. |
| 2013/0099626 A1* | 4/2013 | Takeuchi et al. .............. 310/300 |
| 2013/0134828 A1 | 5/2013 | Okada et al. |
| 2013/0221799 A1* | 8/2013 | Nakatsuka et al. ........... 310/300 |

FOREIGN PATENT DOCUMENTS

| | | |
|---|---|---|
| JP | 2007-312551 | 11/2007 |
| JP | 2008-161040 | 7/2008 |
| JP | 2008-278607 | 11/2008 |
| JP | 2009-171676 | 7/2009 |
| JP | 2011-36089 | 2/2011 |
| JP | 2011-45194 | 3/2011 |
| JP | 2011-142759 | 7/2011 |
| WO | 2008/053793 | 5/2008 |
| WO | 2011/067936 | 6/2011 |

OTHER PUBLICATIONS

Takumi Tsutsumino et al., "Seismic Power Generator Using High-Performance Polymer Electret", MEMS, 2006, Istanbul, Turkey, pp. 98-101, Jan. 2006.

\* cited by examiner (a)

(b)

| | STRUCTURE OF FIRST EMBODIMENT | PRIOR ART |
|---|---|---|
| Cmax | 1.35 | 1 |
| Cmin | 0.17 | 0.17 |

※Cmax OF PRIOR ART=1

(a)

(b)

VIBRATION POWER GENERATOR AND VIBRATION POWER GENERATION DEVICE, AND COMMUNICATION DEVICE AND ELECTRONIC EQUIPMENT WITH VIBRATION POWER GENERATION DEVICE

BACKGROUND ART

The present disclosure relates to a vibration power generator and a vibration power generation device and to a communication device and an electronic equipment with a vibration power generation device, and more particularly, relates to an electrostatic induction vibration power generator and vibration power generation device using an electret material and to a communication device and an electronic equipment with the vibration power generation device.

BACKGROUND ART

As a conventional vibration power generation device, an electrostatic induction vibration power generation device is known in which a charge is applied to one electrode of a variable capacitor and a charge is induced to the opposed other electrode by electrostatic induction. In the electrostatic induction vibration power generation device, when the electrostatic capacitance is increased or decreased, the induced charge is changed, and the charge change is taken out as electric energy, thereby generating power (for example, see Patent Document 1).

FIG. 14 is a schematic cross-sectional view of a vibration power generator 10 as an example of the conventional electrostatic induction vibration power generator using an electret material (see FIG. 4 and page 10 to page 11 of Patent Document 1).

The vibration power generator 10 shown in FIG. 14 is provided with a first substrate 11 having a plurality of conductive surface regions 13 and a second substrate 16 having a plurality of electret material regions 15. The first substrate 11 and the second substrate 16 are disposed so as to be separated by a predetermined distance. The second substrate 16 including the electret material regions 15 is used as a fixed member. The first substrate 11 including the conductive surface regions 13 is coupled to fixed structures 17 by springs 19. One ends of the right and left springs 19 are connected to side surfaces of the first substrate 11, and the other ends thereof are connected to the fixed structures 17. By the springs 19, the first substrate 11 is capable of moving, for example, in the horizontal direction of FIG. 14 and returning to the home position. That is, the first substrate 11 is elastically supported by the right and left springs 19. By the first substrate 11 as a movable member moving with respect to the second substrate 16 as the fixed member, the area of the overlap between the electret material regions 15 and the opposed conductive surface regions 13, that is, the electrostatic capacitance is increased or decreased, so that a charge change occurs in the conductive surface regions 13. The electrostatic induction vibration power generator 10 generates power by taking out this charge change as electric energy.

Then, according to the frequency of the vibration used for power generation, the resonance frequency of the vibration of the first substrate 11 is selected.

Non-Patent Document 1 discloses an electrostatic induction vibration power generator similar to that of Patent Document 1. FIG. 15A is a perspective view of an electrostatic induction vibration power generator disclosed in Non-Patent Document 1. FIG. 15B is a cross-sectional view showing the electrode configuration.

A vibration power generator 20 is constituted by a first substrate 21 having a plurality of electret electrodes 23 and a second substrate 26 having a plurality of counter electrodes 25. The first substrate 21 and the second substrate 26 are disposed at a predetermined distance from each other. The second substrate 26 including the counter electrodes 25 is used as a fixed member. The first substrate 21 including the electret electrodes 23 is coupled to fixed structures 27 by right and left springs 29. One end portions of the springs 29 are connected to side surfaces of the first substrate 21, and the other end portions thereof are connected to the fixed structures 27. The operation of this vibration power generator 20 is similar to that of Patent Document 1.

As shown in FIG. 15B, the electret electrodes 23 and guard electrodes 28 are formed in strip form.

PRIOR ART DOCUMENTS

Patent Document

[Patent Document 1] Japanese Unexamined Patent Application Publication No. 2005-529574

Non-Patent Document

[Non-Patent Document 1] T. Tsutsumino, Y. Suzuki, N. Kasagi, and Y. Sakane "SEISMIC POWER GENERATOR USING HIGH-PERFORMANCE POLYMER ELECTRET," MEMS 2006, Istanbul, Turkey, (2006), pp. 98-101

SUMMARY OF THE INVENTION

Technical Problem

However, in the configuration of the conventional vibration power generator 20 shown in Non-Patent Document 1, the guard electrodes 28 are always connected to GND. As a consequence, the maximum value of the electrostatic capacitance is low compared with a case where no guard electrodes 28 are formed, so that there is a problem that the output power that can be taken out as output power is reduced.

Accordingly, a technical problem that the present disclosure is to solve is to provide a vibration power generator and a vibration power generation device that increase output power by improving the electrostatic capacitance (maximum electrostatic capacitance) when the area of the overlap between the electret electrodes and the counter electrodes is maximum while having the function of limiting the spread of the electric field from the electret electrodes like the conventional guard electrodes, and a communication device and an electronic equipment with the vibration power generation device.

Solution to Problem

To solve the above-mentioned technical problem, according to the present disclosure, the following vibration power generator and vibration power generation device, and a communication device and an electronic equipment with the vibration power generation device are provided.

That is, a vibration power generator according to the present disclosure is provided with: a first substrate and a second substrate configured so as to be relatively movable while keeping a condition of being separated so as to be opposed to each other; a first electrode formed on the first substrate; a second electrode formed on the second substrate so as to be opposed to the first electrode; and a third electrode formed in a region different from the first electrode on the first substrate, either one of the first electrode and the second electrode includes a film holding a charge, and when an overlap between the first electrode and the second electrode is minimum, the third electrode is grounded, and when the overlap between the first electrode and the second electrode is maximum, the third electrode is open.

Advantageous Effects of Invention

With the vibration power generator according to the present disclosure, since the third electrode is grounded when the overlap between the first electrode and the second electrode is minimum and the third electrode is open when the overlap between the first electrode and the second electrode is minimum, an effect is produced that the change of the electrostatic capacitance between the minimum capacitance and the maximum capacitance can be increased and the output power can be increased.

DESCRIPTION OF EMBODIMENTS

Figure 1:
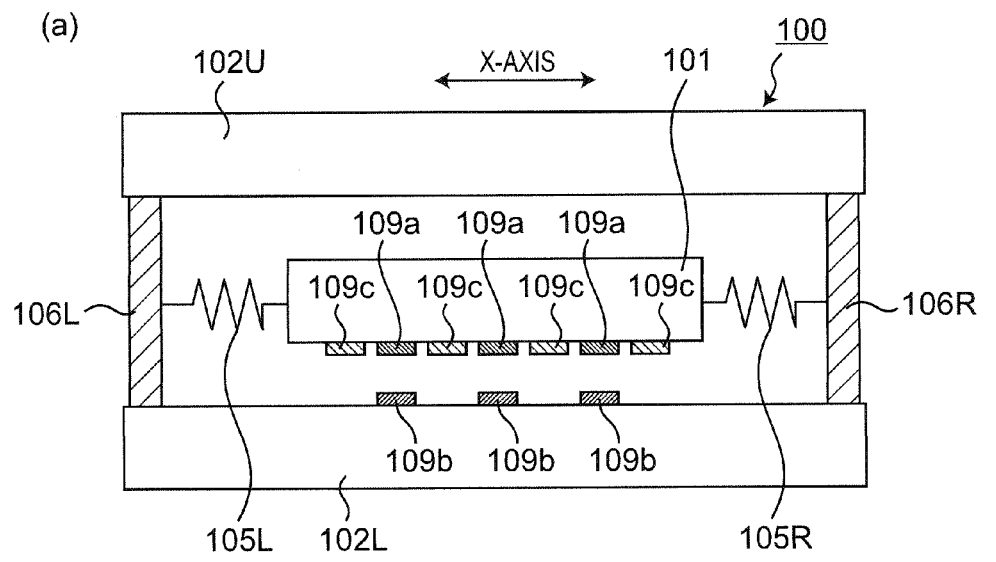
FIG. 1 is views schematically explaining a vibration power generator according to a first embodiment of the present disclosure: (a) is a cross-sectional view of the vibration power generator, and (b) is a cross-sectional view of a part involved in power generation.
Figure 1:
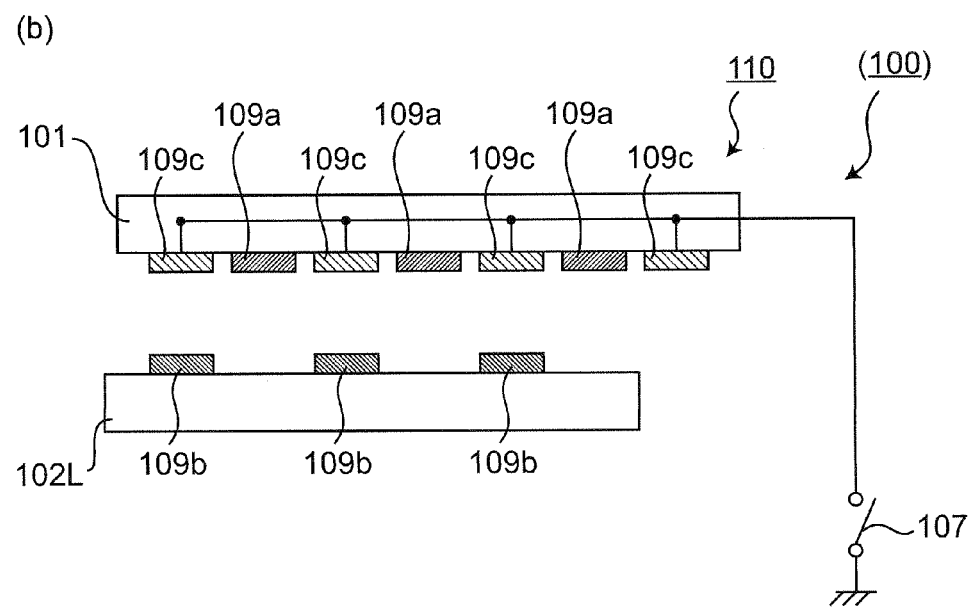

Hereinafter, with reference to the drawings, embodiments according to the present disclosure will be described in detail. In the following description, terms indicative of specific directions and positions (for example, "upper", "lower", "right", "left" and other terms including these words) are used as required. However, the use of those terms is for facilitating understanding of the present disclosure when the drawings are referred to, and the technical scope of the present disclosure is not limited by the meanings of those terms. Parts of the same reference numerals shown in a plurality of drawings indicate the same parts or members.

First Embodiment

Figure 2:
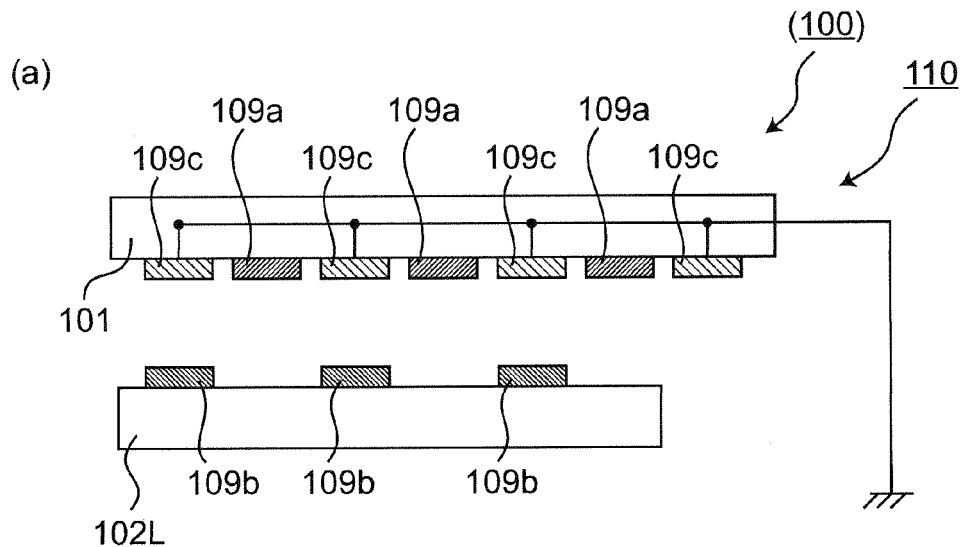
FIG. 2 is cross-sectional views of the part involved in power generation corresponding to FIG. 1(a): (a) shows a case where the area of the overlap between first electrodes and second electrodes is minimum, and (b) shows a case where the area of the overlap between the first electrodes and the second electrodes is maximum.
Figure 2:
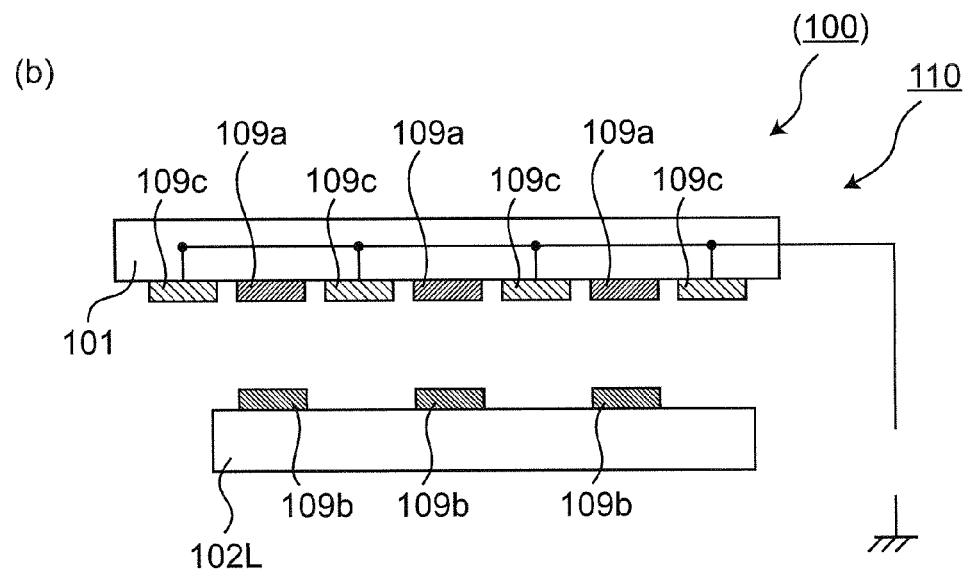

FIG. 1 is views schematically explaining a vibration power generator 100 according to a first embodiment of the present disclosure. FIG. 1(a) is a cross-sectional view of the vibration power generator 100, and FIG. 1(b) is a cross-sectional view of a part 110 involved in power generation. FIG. 2 focuses on a change of the condition of the overlap between first electrodes 109a and second electrodes 109b due to vibration of a first substrate 101 in the part 110 involved in power generation. FIG. 2(a) shows a case where the area of the overlap between the first electrodes 109a and the second electrodes 109b is minimum, and FIG. 2(b) shows a case where the area of the overlap between the first electrodes 109a and the second electrodes 109b is maximum. In FIG. 1 and FIG. 2, for simplicity, the wiring configuration for taking out the generated power is not illustrated.

The vibration power generator 100 is provided with: the first substrate 101 as a movable member; a second substrate 102L as a fixed member opposed to the lower surface of the first substrate 101; and a third substrate 102U opposed to the upper surface of the first substrate 101. The first substrate 101 is separated from the second substrate 102L and the third substrate 102U by predetermined distances, respectively.

The second substrate 102 and the third substrate 102U are coupled by supports 106L and 106R. The first substrate 101 is supported by elastic springs 105L and 105R with respect to the supports 106L and 106R. That is, the first substrate 101 is elastically supported by the left and right elastic springs 105L and 105R. For this reason, in the configuration of the vibration power generator 100 shown in FIG. 1(a), the second substrate 102 and the third substrate 102U are used as fixed members, whereas the first substrate 101 is used as a movable member capable of reciprocating in the X-axis direction (the horizontal direction in FIG. 1).

On the lower surface of the first substrate 101, a plurality of first electrodes 109a are formed. On the upper surface of the second substrate 102L opposed to the first substrate 101, a plurality of second electrodes 109b are formed in positions opposed to the first electrodes 109a. Between the adjacent two first electrodes 109a, third electrodes 109c are formed. In the present embodiment, the first electrodes 109a are electret electrodes including an electret film holding a charge, and the electret electrodes are constituted by the electret film holding the charge and a conductive layer.

On part of the region of the lower surface of the first substrate 101 where the first electrodes 109a are not formed, a plurality of third electrodes 109c are formed. The third electrodes 109c are each electrically connected to GND by a switching element 107.

Next, the operation of the vibration power generator 100 will be described.

In the vibration power generator 100 according to the present embodiment, the first substrate 101 is displaced, for example, in the X-axis direction by an externally applied action (vibration). By the restoring force of the elastic springs 105L and 105R, the first substrate 101 moves so as to return to the home position. Although when the external action (vibration) is stopped, the vibration of the first substrate 101 is damped and stops, the first substrate 101 continues to vibrate as long as the external action (vibration) continues.

At this time, when the first substrate 101 is displaced, for example, in the X-axis direction, the area (condition) of the overlap between the first electrodes 109b and the second electrodes 109a is changed, whereby the vibration power generator 100 generates power. Then, as shown in FIG. 2, when the first substrate 101 vibrates, the condition of the third electrodes 109c is controlled according to the area (condition) of the overlap between the first electrodes 109a and the second electrodes 109b. FIG. 2(a) shows a case where the area (condition) of the overlap between the first electrodes 109a and the second electrodes 109b is minimum, and FIG. 2(b) shows a case where the area (condition) of the overlap between the first electrodes 109a and the second electrodes 109b is maximum.

That is, when the area (condition) of the overlap between the first electrodes 109a and the second electrodes 109b is minimum, by turning on the switching element 107, the third electrodes 109c are connected to GND. On the other hand, when the area (condition) of the overlap between the first electrodes 109a and the second electrodes 109b is maximum, by turning off the switching element 107, the third electrodes 109c are brought into an open state.

Hereinafter, the third electrodes 109c that control the spread of the electric field caused from the electret electrodes will be described in detail.

Figures 3, 4:
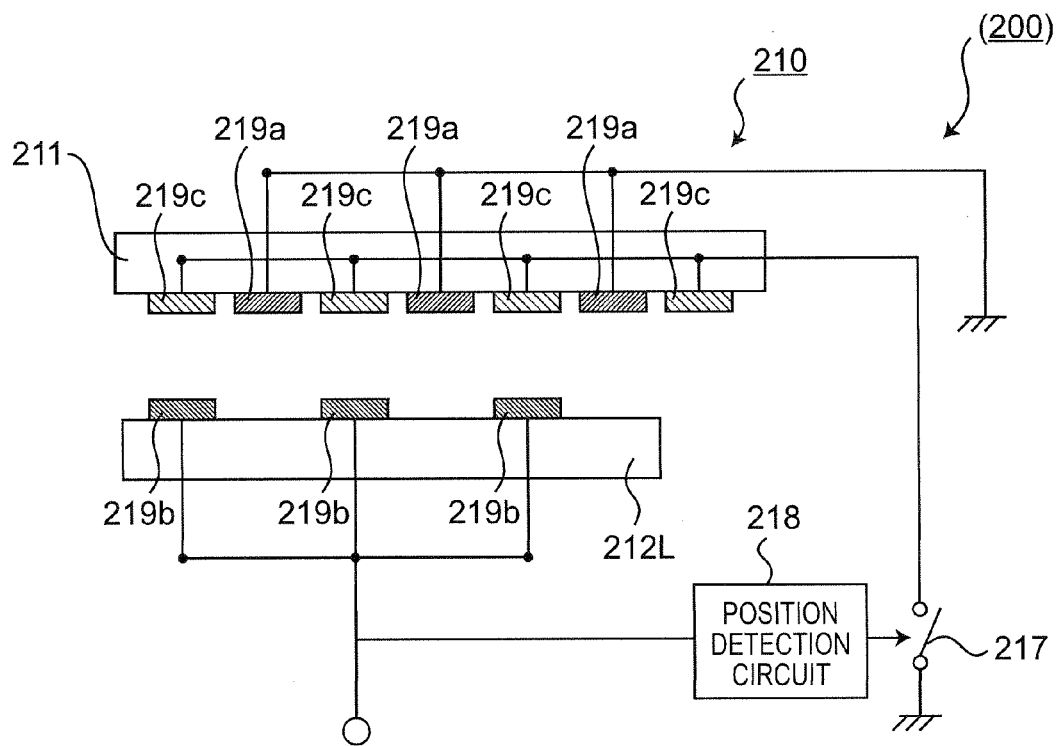
FIG. 3 is an explanatory view in which the relationship between the maximum value and the minimum value of the electrostatic capacitance is compared between the vibration power generator according to the first embodiment of the present disclosure and the vibration power generator of the prior art.
FIG. 4 is a schematic cross-sectional view of a part, involved in power generation, of a vibration power generator according to a second embodiment of the present disclosure.

In the vibration power generator 100 shown in the first embodiment, the electrostatic capacitance formed between the opposed two groups of electrodes, that is, the first electrodes 109a and the second electrodes 109b is changed by vibration in the X-axis direction, whereby electric energy is taken out. At this time, by controlling the condition of the third electrodes 109c, the change of the electrostatic capacitance formed between the first electrodes 109a and the second electrodes 109b can be increased. According to the prior art, the electrodes interposed between the adjacent electret electrodes are always connected to GND as so-called guard electrodes. In FIG. 3, based on the maximum electrostatic capacitance value Cmax in the case of the prior art where the guard electrodes are always connected to GND, setting the value at that time to 1, and then comparison with the other electrostatic capacitance value is made.

In the configuration of the prior art having the guard electrodes that are always grounded, the electrostatic capacitance between the first electrodes 109a and the second electrodes 109b varies within a range from 0.17 which is the minimum value (Cmin) when the area (condition) of the overlap is minimum to 1 which is the maximum value (Cmax) when the area (condition) of the overlap is maximum. On the contrary, in the configuration according to the present disclosure where the condition of the third electrodes 109c is controllable, the electrostatic capacitance between the first electrodes 109a and the second electrodes 109b varies within a range from 0.17 which is the minimum value (Cmin) when the area (condition) of the overlap is minimum to 1.35 which is the maximum value (Cmax) when the area (condition) of the overlap is maximum. In the configuration of the present embodiment, although the minimum value (Cmin) of the induced electrostatic capacitance is the same as that of the prior art, the maximum value (Cmax) is improved by 35% from that of the prior art.

Thus, by appropriately changing the condition of the third electrodes 109c in accordance with the change of the position of the first substrate 101, that is, the change of the area (condition) of the overlap between the first electrodes 109a and the second electrodes 109b, the change of the electrostatic capacitance between the maximum value (Cmax) and the minimum value (Cmin) can be increased. By the electrostatic capacitance change increasing, the amount of charge that moves between the vibration power generator 100 and an external circuit is increased, so that the output power can be increased.

The combination of the third electrodes 109c and the switching element 107 has the function of controlling the spread of the electric field caused from the first electrodes 109a which are electret electrodes.

That is, when the third electrodes 109c are open (floating), the electric field caused from the first electrodes 109a spreads without limited by the third electrodes 109c. As a consequence, the amount of charge induced on the second electrodes 109b is increased by the electric field caused from the first electrodes 109a. Therefore, if the third electrodes 109c are open when the area (condition) of the overlap between the first electrodes 109a and the second electrodes 109b is maximum, the maximum value (Cmax) of the electrostatic capacitance is higher than that of the prior art.

On the contrary, when the third electrodes 109c are connected to GND, the electric field caused from the first electrodes 109a is pulled toward the third electrodes 109c, so that the third electrodes 109c act to suppress the spread of the electric field in the lateral direction. As a consequence, the second electrodes 109b are not readily influenced by the electric field caused from the first electrodes 109a, so that the amount of charge induced on the second electrodes 109b is reduced. Therefore, if the third electrodes 109c are grounded when the area (condition) of the overlap between the first electrodes 109a and the second electrodes 109b is minimum, the minimum value (Cmin) of the capacitance is decreased to a level equal to that of the prior art.

As described above, with the vibration power generator 100 according to the first embodiment, an effect that the output power can be increased is produced.

While in the present embodiment, a case where the first electrodes 109a are electret electrodes are shown as an example, a similar effect is produced in a case where the second electrodes 109b are electret electrodes.

As the material for the electret film holding a charge, a polymeric material such as polypropylene, polyester terephthalate or polyvinyl chloride, or an inorganic material such as oxide silicon may be used.

Moreover, in order to improve the resistance to moisture, it is preferable to employ a configuration in which the periphery of oxide silicon as the electret film is completely covered with an insulating film such as a silicon nitride film. For example, when oxide silicon is used, by employing the configuration in which the periphery of the oxide silicon is completely covered with an insulating film such as a silicon nitride film, an electret electrode can be obtained that is excellent in dielectric strength voltage, heat resistance and further, moisture resistance.

The second electrodes 109b may be formed in a wide region to where the second electrodes 109b extensively extend to a region beyond the first electrodes 109a (to a region outside the first electrodes 109a) in the direction of vibration of the first substrate 101. More preferably, the second electrodes 109b may be formed up to the vibration limit (a range where displacement by vibration is possible) of the first substrate 101 (particularly, the first electrodes 109a).

According to this configuration, an effect is produced that power generation can be performed up to the maximum displacement.

If the second electrodes 109b are formed so that the first electrodes 109a and the second electrodes 109b are substantially the same as each other in the direction of vibration of the first substrate 101, when the first substrate 101 vibrates with a large amplitude (displacement), the time increases during which the first electrodes 109a (particularly, the first electrodes situated at the ends) and the second electrodes 109b do not overlap each other, so that a problem that output power is decreased occur.

However, by forming the region of the second electrodes 109b so as to be larger than the region of the first electrodes 109a (forming the region of the second electrodes 109b up to the region outside the first electrodes 109a) in the direction of vibration of the first substrate 101, the time can be eliminated during which the opposed electrodes 109a and 109b do not overlap each other, so that the decrease in output power can be suppressed. That is, the output power of the vibration power generator 100 can be stabilized.

This configuration of the second electrodes 109b is effective particularly for a vibration power generator in which the amplitude of vibration of the first substrate 101 can be made large and the first electrodes 109a can vibrate beyond the width of the second electrodes 109b (for example, the width of each electrode of the second electrodes).

Further, the shape of the electrode formed surface of the first substrate 101 may be a rectangle or other shapes as well as a square.

Second Embodiment

FIG. 4 is a cross-sectional view of a part 210, involved in power generation, of a vibration power generator 200 according to a second embodiment of the present disclosure. The area (condition) of the overlap between first electrodes 219a and second electrodes 219b is detected by the second electrodes 219b. The operation and the like are similar to those of the first embodiment.

The part 210 involved in power generation shown in FIG. 4 is provided with: a first substrate 211 as a movable member; a second substrate 212L as a fixed member opposed to the lower surface of the first substrate 211; a position detection circuit 218; and a switching element 217. On the lower surface of the first substrate 211, a plurality of first electrodes 219a are formed. On the upper surface of the second substrate 212L, a plurality of second electrodes 219b are formed. On part of the region of the lower surface of the first substrate 211 where the first electrodes 219a are not formed, a plurality of third electrodes 219c are formed. In the second embodiment, the first electrodes 219a are electret electrodes including an electret film holding a charge, and the electret electrodes are constituted by the electret film holding the charge and a conductive layer.

The third electrodes 219c are each connected to GND through the switching element 217. The switching element 217 switches to an on-state or an off-state based on a signal from the position detection circuit 218. The position detection circuit 218 is electrically connected to the second electrodes 219b as means for detecting the condition (position) of the overlap between the first electrodes 219a and the second electrodes 219b.

At the position detection circuit 218, the condition (position) of the overlap between the first electrodes 219a and the second electrodes 219b is detected based on an AC output voltage from the second electrodes 219b. Since the absolute value of the voltage amplitude is maximum in the conditions (positions) where the overlap region is in the neighborhood of the maximum and the minimum, the condition (position) of the overlap is detected by detecting this voltage amplitude. The detected voltage amplitude is converted, for example, into a DC voltage signal and inputted to the switching element 217. When the inputted DC voltage signal VDC is higher than the operating voltage of the switching element 217, the switching element 217 is the on-state, and when it is not more than that, the switching element 217 is the off-state.

The output voltage from the second electrodes 219b is outputted as an AC voltage. The operation of the switching element 217 when a mechanical switch such as a MEMS (micro electro mechanical systems) switch is used for the switching element 217 will be described as an example.

The MEMS switch does not perform switching at a predetermined voltage (threshold value) which is not more than the pull-in voltage. When the DC voltage signal VDC becomes a value not less than the pull-in voltage, the switching element 217 becomes on (connected to GND), and when the DC voltage signal VDC becomes a value not more than the pull-in voltage, the switching element 217 becomes the off-state (open state).

The predetermined voltage (threshold value) at which switching is performed is determined by the switching element 217, and is set so that the switching element 217 becomes the on-state (connected to GND) at least at the timing when the area (condition) of the overlap between the first electrodes 219a and the second electrodes 219b is minimum.

Alternatively, the predetermined voltage (threshold value) at which switching is performed is set so that the switching element 217 becomes the off-state (open state) at least at the timing when the area (condition) of the overlap between first electrodes 219a and the second electrodes 219b is maximum.

For example, the switching element 217 can be switched to the on-state (connected to GND) or the off-state (open state) at the timing when the area (condition) of the overlap between the first electrodes 219a and the second electrodes 219b is an intermediate one. The timing of switching may be shifted either to the side of the maximum overlap area (condition) or to the side of the minimum overlap area (condition). In short, it is necessary only that when the area (condition) of the overlap is maximum, the switching element 217 should be the off-state (open state) and when the area (condition) of the overlap is minimum, the switching element 217 should be the on-state (grounded).

With the vibration power generator 200 according to the second embodiment, since the increase and decrease in output voltage in the system that outputs the voltage involved in power generation can be used for controlling the condition of the third electrodes 219c as it is, more accurate control is possible.

In the vibration power generator 200 shown in the second embodiment, the position detection circuit 218 is electrically connected to the second electrodes 219b. The position detection circuit 218 detects the condition (position) of the overlap between the first electrodes 219a and the second electrodes 219b based on the AC output voltage from the second electrodes 219b involved in power generation. Based on the detected condition (position) of the overlap, the switching element 217 is switched to the on-state or the off-state and the third electrodes 219c are switched to the grounded condition or the open condition, whereby the condition of the third electrodes 219c can be controlled.

Figure 5:
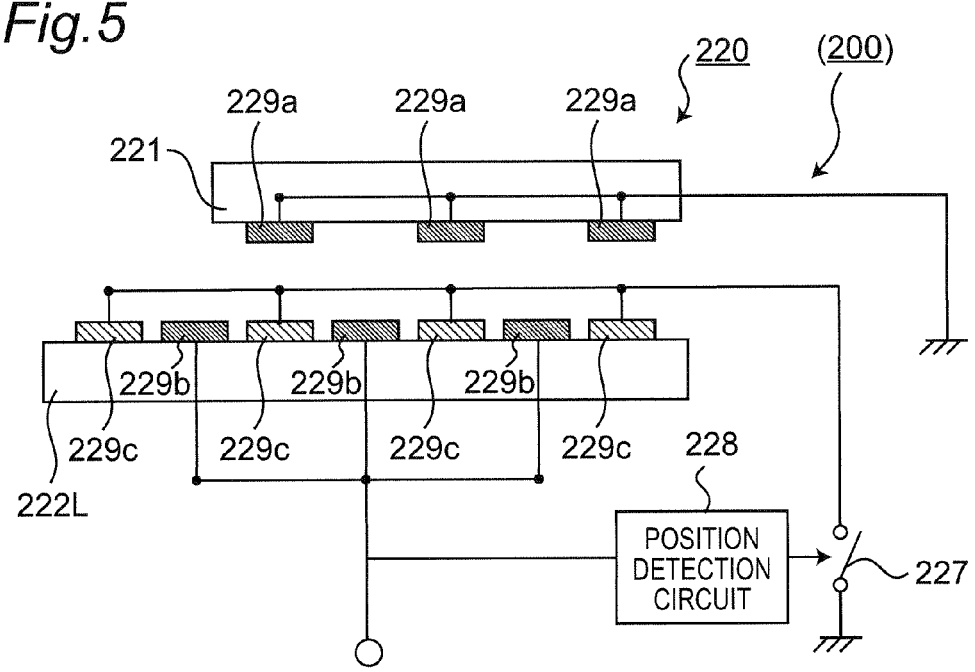
FIG. 5 is a schematic cross-sectional view of a part, involved in power generation, of a vibration power generator according to a modification of the second embodiment of the present disclosure.

FIG. 5 shows a modification of the above-described second embodiment. The difference between the modification of FIG. 5 and the one shown in FIG. 4 is that third electrodes 229c are formed on the upper surface of a second substrate 222L where second electrodes 229b are formed. The spread of the electric field caused from first electrodes 229a (electret electrodes) formed on the lower surface of a first substrate 221 is controlled by the third electrodes 229c formed on the upper surface of the second substrate 222L. That is, when the third electrodes 229c are open (floating), the electric field from the first electrodes 229a spreads without limited. When the third electrodes 229c are connected to GND, the third electrodes 229c suppress the electric field leakage in the lateral direction.

A position detection circuit 228 is electrically connected to the second electrodes 229b involved in power generation. Based on the AC output voltage from the second electrodes 229b, the position detection circuit 228 detects the condition (position) of the overlap between the first electrodes 229a and the second electrodes 229b. By switching a switching element 227 to the on-state or the off-state based on the detected condition (position) of the overlap, the third electrodes 229c can be controlled to the grounded condition or the open condition. Consequently, a similar effect is produced in the modification of the second embodiment shown in FIG. 5.

Moreover, the third electrodes 229c may be formed on the side of the first substrate 221 where the first electrodes 229a are formed and on the side of the second substrate 222L where the second electrodes 229b are formed. In this configuration, by switching the third electrodes 229c to the grounded condition or the open condition based on the area (condition) of the overlap between the first electrodes 229a and the second electrodes 229b, a similar effect is produced.

Third Embodiment

Figure 6:
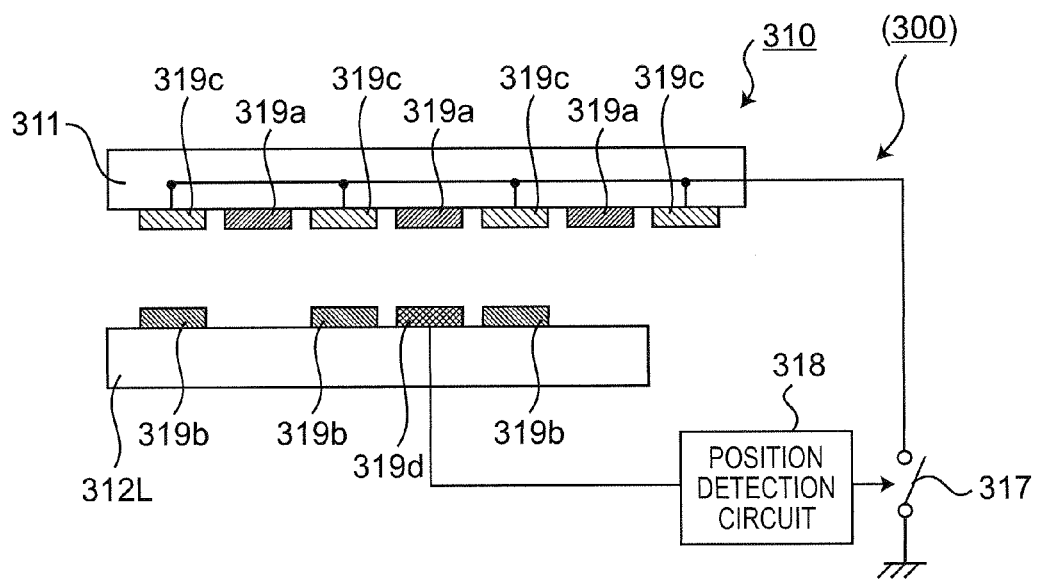
FIG. 6 is a schematic cross-sectional view of a part, involved in power generation, of a vibration power generator according to a third embodiment of the present disclosure.

FIG. 6 is a cross-sectional view of a part 310 involved in power generation, of a vibration power generator 300 according to a third embodiment of the present disclosure.

The difference between the third embodiment and the second embodiment is that the condition (position) of the overlap between first electrodes 319a and second electrodes 319b is detected by a fourth electrode 319d, and the power generation operation, the detection operation of the condition (position) of the overlap and the control of the condition of third electrodes 319c are similar to those of the first embodiment and the second embodiment.

The part 310 involved in power generation shown in FIG. 6 is provided with: a first substrate 311 as a movable member; a second substrate 312L as a fixed member opposed to the lower surface of the first substrate 311; a position detection circuit 318 electrically connected to the fourth electrode 319d; and a switching element 317. On the lower surface of the first substrate 311, a plurality of first electrodes 319a are formed. On the upper surface of the second substrate 312L, a plurality of second electrodes 319b are formed. On part of the region of the lower surface of the first substrate 311 where the first electrodes 319a are not formed, a plurality of third electrodes 319c are formed. On part of the region of the upper surface of the second substrate 312L where the second electrodes 319b are not formed, the fourth electrode 319d is formed. In the third embodiment, the first electrodes 319a are electret electrodes including an electret film holding a charge.

The third electrodes 319c are connected to GND through the switching element 317. The switching element 317 performs switching based on a signal from the position detection circuit 318. The position detection circuit 318 detects the condition (position) of the overlap between the first electrodes 319a and the second electrodes 319b.

With the vibration power generator 300 according to the third embodiment, an effect is produced that the output power from vibration can be increased and can be effectively taken out.

The vibration power generator 300 shown in the third embodiment is provided with the fourth electrode 319d used for detecting the condition (position) of the overlap between the first electrodes 319a and the second electrodes 319b in addition to the first electrodes 319a and the second electrodes 319b involved in power generation. Based on the AC output voltage from the fourth electrode 319d, the position detection circuit 318 detects the condition (position) of the overlap. By switching the switching element 317 to an on-state or an off-state based on the detection result, the third electrodes 319c are controlled to the grounded condition or the open condition. Consequently, since the change of the electrostatic capacitance formed between the first electrodes 319a and the second electrodes 319b can be increased, the output power can be increased. At the same time, since the system that detects the condition (position) of the overlap is different from the system that outputs the voltage involved in power generation, the output power can be controlled without decreased.

(Position Detection Circuit)

Figure 7:
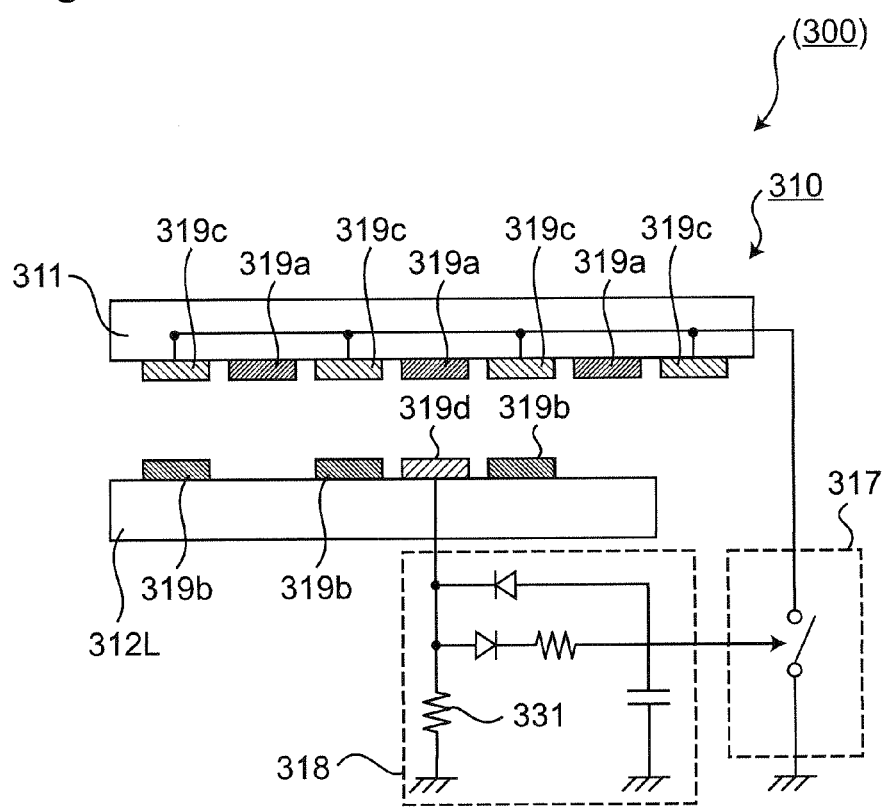
FIG. 7 is a view illustrating a position detection circuit of the vibration power generator shown in FIG. 6.

FIG. 7 illustrates the configuration of the position detection circuit 318 shown in FIG. 6. The position detection circuit 318 is constituted by resistors, a capacitor and diodes. Since an AC voltage signal is outputted from the fourth electrode 319d, the peak of the voltage amplitude is detected by the diodes. The detected voltage signal is peak-held by the resistors and the capacitor, and inputted to the switching element 317. The switching element 317 becomes the on-state at a predetermined voltage (threshold value) or higher to make the third electrodes 319c connected to GND. When the voltage is not more than the predetermined voltage (threshold value), the switching element 317 remains in the off-state to keep the third electrodes 319c open. As an example of the switching element used as the switching element 317, not only a semiconductor switch such as an FET but also a relay and a MEMS switch may be used.

In the position detection circuit 318 shown in FIG. 7, the value of the voltage amplitude is adjustable by the impedance of a resistor 331, and can be adjusted so that the voltage is one that can make the switching element 317 the on-state. With this configuration, by increasing the resistor 331 (light load) when the voltage amplitude is increased and decreasing the resistor 331 (heavy load) when the voltage amplitude is decreased, the load on the fourth electrode 319d can be set so that the voltage is a desired one independently of the load in the system that takes out power.

Fourth Embodiment

Figure 8:
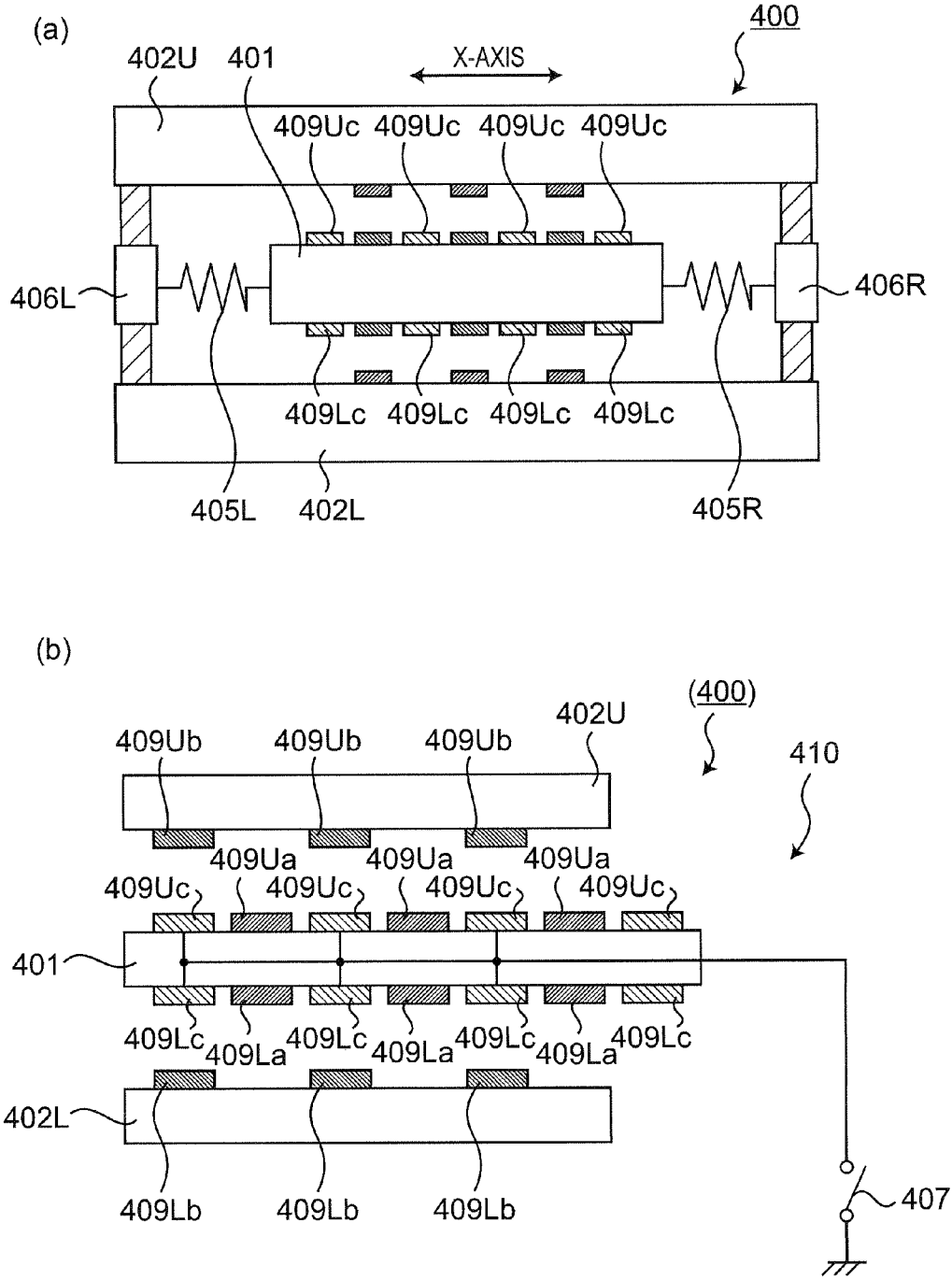
FIG. 8 is views schematically explaining a vibration power generator according to a fourth embodiment of the present disclosure: (a) is a cross-sectional view of the vibration power generator, and (b) is a cross-sectional view of a part involved in power generation.

FIG. 8 is views schematically explaining a vibration power generator 400 according to a fourth embodiment of the present disclosure: (a) is a cross-sectional view of the vibration power generator 400, and (b) is a cross-sectional view of a part 410 involved in power generation.

The difference between the fourth embodiment and the above-described first embodiment is that electrodes are formed on each of the upper surface and lower surface of a first substrate 401, the upper surface of a second substrate 402L and the lower surface of a third substrate 402U, and power is generated between the first substrate 401 and the second substrate 402L and between the first substrate 401 and the third substrate 402U.

The vibration power generator 400 shown in FIG. 8(a) is provided with: the first substrate 401 as a movable member; the second substrate 402L as a fixed member opposed to the lower surface of the first substrate 401; and the third substrate 402U opposed to the upper surface of the first substrate 401. The first substrate 401 is separated from the second substrate 402L and the third substrate 402U by predetermined distances, respectively.

The second substrate 402L and the third substrate 402U are coupled by supports 406L and 406R. The first substrate 401 is supported with respect to the supports 406L and 406R by elastic springs 405L and 405R, respectively. The first substrate 401 is elastically supported by the left and right elastic springs 405L and 405R. In the configuration of the vibration power generator 400 shown in FIG. 8(a), the second substrate 402L and the third substrate 402U are used as fixed members, whereas the first substrate 401 is used as a movable member capable of reciprocating in the X-axis direction (the horizontal direction of FIG. 8(a)).

The part 410 involved in power generation shown in FIG. 8(b) is provided with: the first substrate 401; the second substrate 402L opposed to the lower surface of the first substrate 401; the third substrate 402U opposed to the upper surface of the first substrate 401; and a switching element 407. On the lower surface of the first substrate 401, a plurality of first electrodes 409La are formed. On part of the region of the lower surface of the first substrate 401 where the first electrodes 409La are not formed, a plurality of third electrodes 409Lc are formed. On the upper surface of the second substrate 402L, a plurality of second electrodes 409Lb are formed. On the upper surface of the first substrate 401, a plurality of fifth electrodes 409Ua are formed. On part of the region of the upper surface of the first substrate 401 where the fifth electrodes 409Ua are not formed, a plurality of seventh electrodes 409Uc are formed. On the lower surface of the third substrate 402U, a plurality of sixth electrodes 109Ub are formed. In the fourth embodiment, the first electrodes 409La and the fifth electrodes 409Ua are electret electrodes including an electret film holding a charge.

The third electrodes 409Lc and the seventh electrodes 409Uc are each connected to GND through the switching element 407. By switching the switching element 407 to an on-state or an off-state based on the area (condition) of the overlap between the first electrodes 409La and the second electrodes 409Lb and the area (condition) of the overlap between the fifth electrodes 409Ua and the sixth electrodes 409Ub, the third electrodes 409Lc and the seventh electrodes 409Uc are controlled to the grounded condition or the open condition.

As described above, even when the power generation region is formed on both of the upper surface and lower surface of the first substrate 401, an action and an effect similar to those of the first embodiment are produced.

Fifth Embodiment

Figure 9:
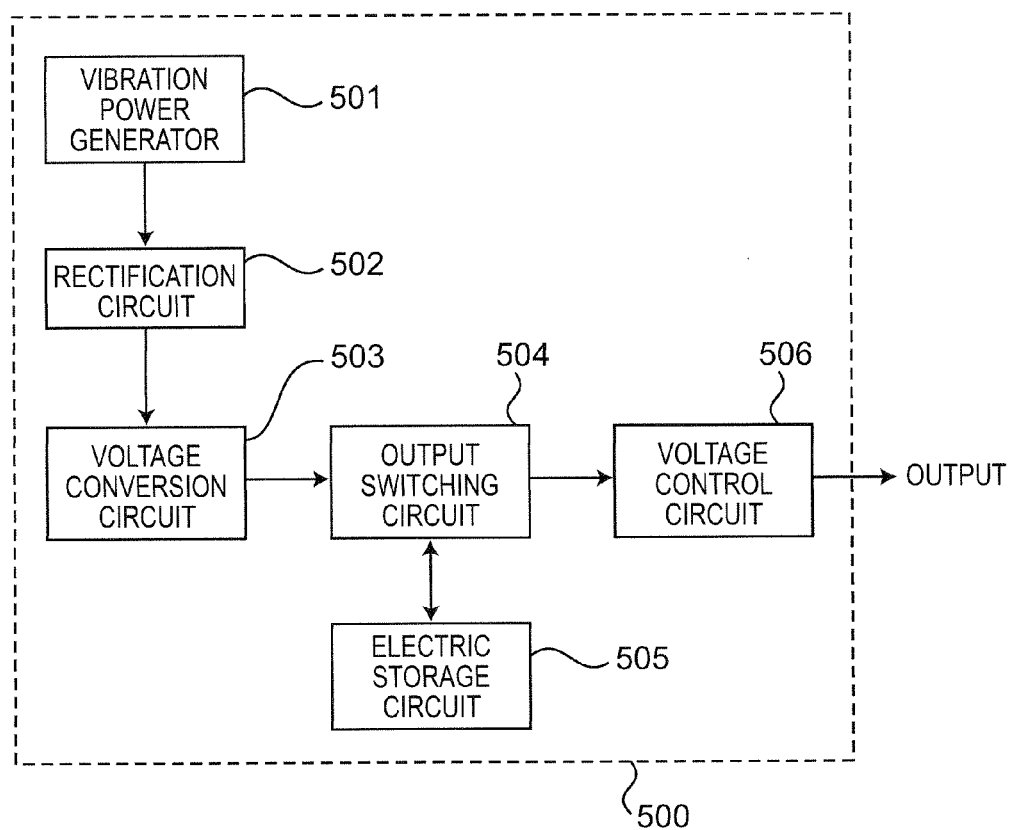
FIG. 9 is a block diagram of a vibration power generation device according to a fifth embodiment of the present disclosure.
Figure 10:
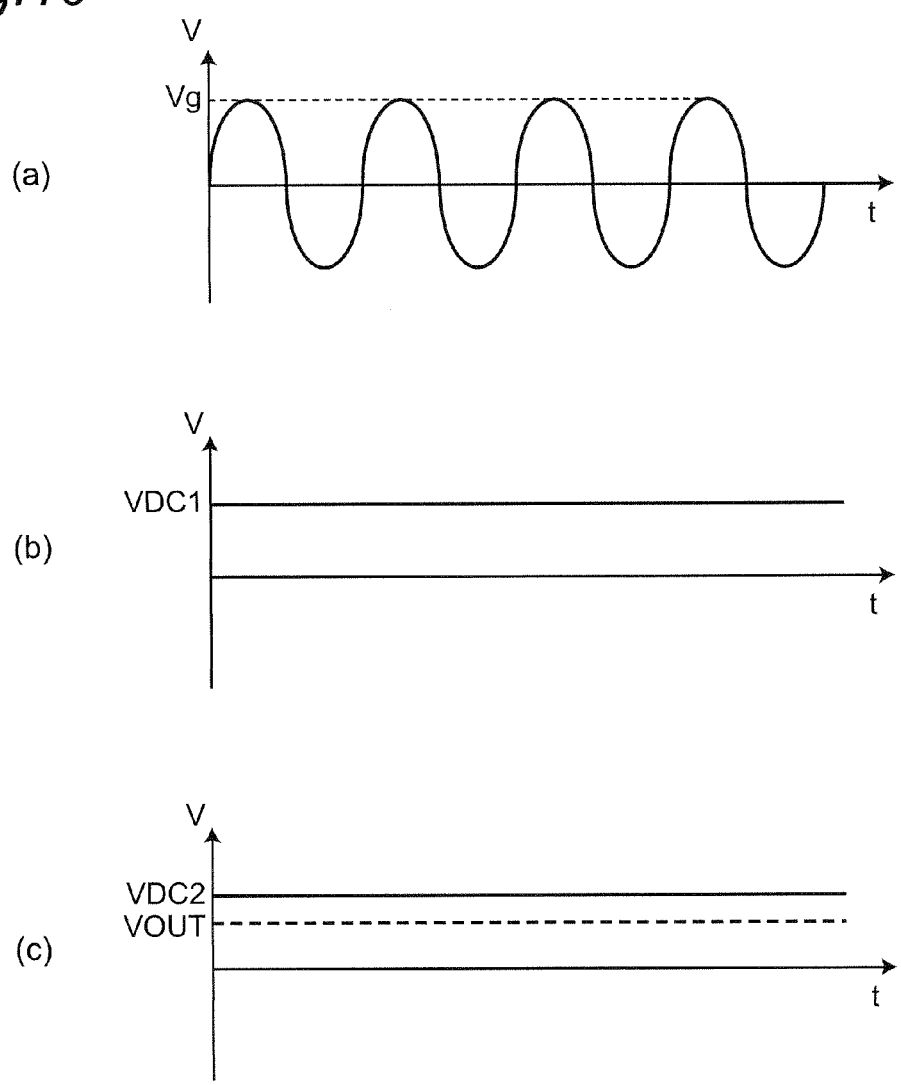
FIG. 10 is views showing the voltage waveforms of parts of the vibration power generation device shown in FIG. 9.

Referring to FIG. 9 and FIG. 10, a vibration power generation device 500 according to a fifth embodiment of the present disclosure will be described. FIG. 9 is a block diagram of the vibration power generation device 500 according to the fifth embodiment. A vibration power generator 501 shown in FIG. 9 is anyone of the vibration power generators disclosed in the first embodiment to the fourth embodiment.

The vibration power generation device 500 shown in FIG. 9 is provided with the vibration power generator 501, a rectification circuit 502, a voltage conversion circuit 503, an output switching circuit 504, an electric storage circuit 505, and a voltage control circuit 506. The AC voltage outputted from the vibration power generator 501 is converted into a DC voltage by the rectification circuit 502. The converted DC voltage is inputted to the voltage conversion circuit 503, and voltage-converted up to a desired output voltage level at the vibration power generation device 500. The converted DC voltage is inputted to the voltage control circuit 506 or the electric storage circuit 505 by the output switching circuit 504. The voltage control circuit 506 controls the voltage so that the DC output voltage is constant, and outputs the DC output voltage.

Referring to FIG. 10, the operation of the vibration power generation device 500 will be described.

FIG. 10 shows the voltage waveforms of parts of the vibration power generation device 500. FIG. 10(a) shows the waveform of the AC output voltage from the vibration power generator 501. In the present embodiment, for simplicity, it is assumed that even in parts where the direction of displacement of the movable member is changed, power is efficiently generated and a sinusoidal AC voltage is outputted by vibration of the movable member. The voltage amplitude Vg of the AC output voltage of the vibration power generator 501 differs according to the amplitude of vibration of the movable member, the gap between the movable member and the fixed members, the amount of charge held by the electret film and the magnitude of the external impedance viewed from the vibration power generator 501. The AC voltage outputted from the vibration power generator 501 is, as shown in FIG. 10(b), converted into a DC voltage VDC1 by the rectification circuit 502. The DC voltage VDC1 is converted to an output voltage level VDC2 of the vibration power generation device 500 by the voltage conversion circuit 503. The operation of the output switching circuit 504 is switched either to store the generated power into the electric storage circuit 505 without outputting it to the voltage control circuit 506 when the voltage output from the vibration power generation device 500 is not necessary, or to output the power stored in the electric storage circuit 505 when the output power is low although the voltage output from the vibration power generation device 500 is necessary. The output from the output switching circuit 504 is, as shown in FIG. 10(c), controlled by the voltage control circuit 506 so that a desired DC output voltage VOUT is outputted.

The output voltage of the vibration power generation device 500 varies due to various factors. To respond to the variation of the output voltage of the vibration power generation device 500, it is preferable to set the output voltage level VDC2 to a voltage slightly higher than the finally outputted DC output voltage VOUT. By setting the output voltage level VDC2 so as to be slightly higher, the output voltage can be made constant even for minute voltage variation. A case where 1.8 V is outputted will be described as an example. In a case where the output voltage level VDC2 is set to 1.8 V, when the output voltage of the vibration power generator 501 is decreased, the DC output voltage VOUT of the vibration power generation device 500 is also decreased; however, for example, by setting the output voltage level VDC2 to 2 V, an effect is produced that a voltage drop of 0.2 V can be sufficiently controlled.

Sixth Embodiment

Figure 11:
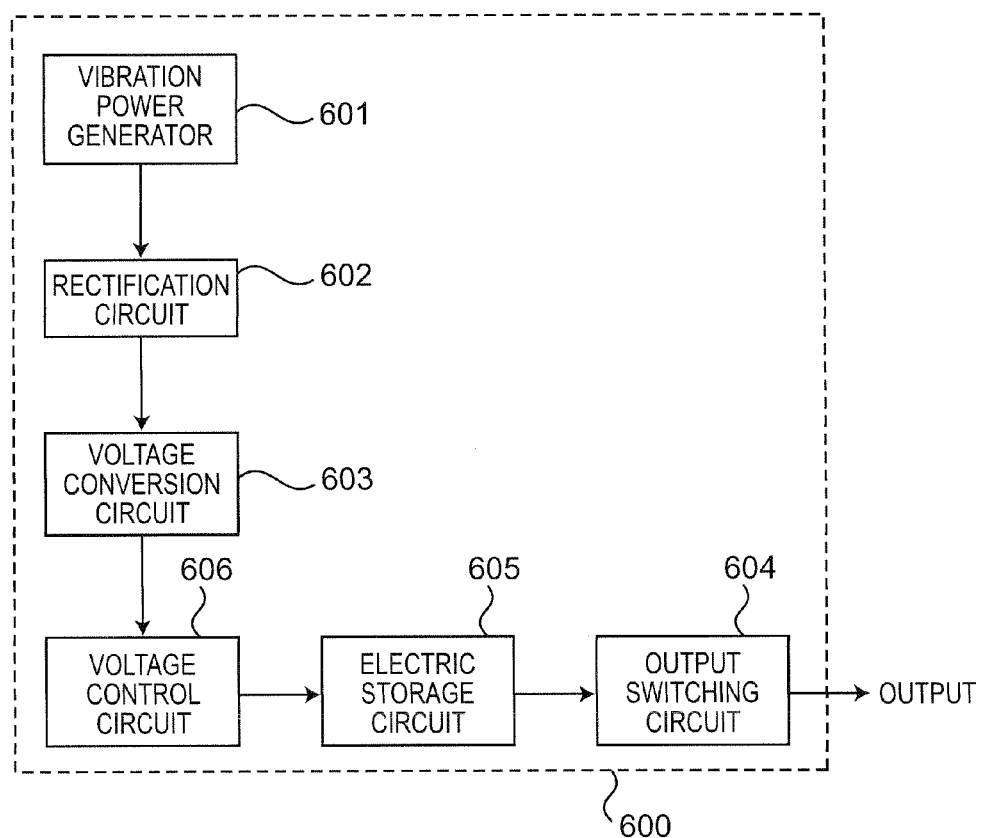
FIG. 11 is a block diagram of a vibration power generation device according to a sixth embodiment of the present disclosure.

FIG. 11 is a block diagram of a vibration power generation device 600 according to a sixth embodiment. In FIG. 11, the vibration power generator 600 is the one shown in any of the first embodiment to the fourth embodiment.

The vibration power generation device 600 shown in FIG. 11 is provided with a vibration power generator 601, a rectification circuit 602, a voltage conversion circuit 603, an output control circuit 604, an electric storage circuit 605, and a voltage control circuit 606. The AC voltage outputted from the vibration power generator 601 is converted into a DC voltage by the rectification circuit 602. The converted DC voltage is inputted to the voltage conversion circuit 603 and voltage-converted to a voltage level where the vibration power generation device 600 can control. The converted DC voltage is controlled to a desired voltage by the voltage control circuit 606 and inputted to the electric storage circuit 605. At the output control circuit 604, the power stored in the electric storage circuit 605 is adjusted to the condition of the load and the output is controlled.

In the vibration power generation device 600 having such a configuration, a similar effect to that of the vibration power generation device 500 according to the fifth embodiment can be obtained.

The operation of the vibration power generation device 600 is substantially the same as the operation of the vibration power generation device 500 according to the fifth embodiment. The DC output voltage of the voltage control circuit 606 is set so that an optimum DC voltage is supplied to the electric storage circuit 605. Moreover, the output control circuit 604 controls the DC output voltage from the vibration power generation device 600 according to the condition of the load.

Seventh Embodiment

Figure 12:
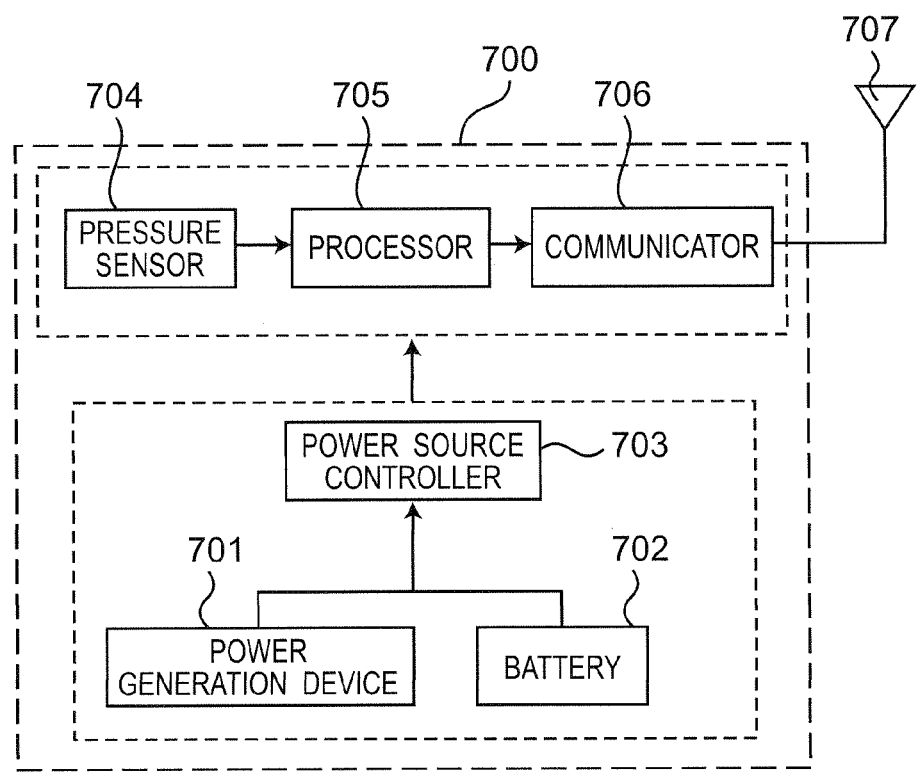
FIG. 12 is a block diagram of a communication device having a vibration power generation device according to a seventh embodiment of the present disclosure.

FIG. 12 is a block diagram of a communication device 700 used in a tire pressure monitoring system or the like installed in a vehicle. In FIG. 12, a vibration power generation device 701 is the one shown in the sixth embodiment.

The communication device 700 shown in FIG. 12 is provided with the vibration power generation device 701, a battery 702, a power source controller 703, a pressure sensor 704, a processor 705, a communicator 706, and an antenna 707. The vibration power generation device 701 generates power by vibration. The battery 702 functions as the main power source of the communication device 700 or as the sub power source of the vibration power generation device 701. The power source controller 703 switches between the output from the vibration power generation device 701 and the output from the battery 702, and supplies the output to the circuit. The pressure sensor 704 measures the air pressure of the tire. The processor 705 processes an output signal from the pressure sensor 704 and transmits it to the communicator 706. The communicator 706 converts an input signal from the processor 705 into a high-frequency signal and transmits it to the antenna 707.

The operation of the communication device 700 will be described.

The power necessary for the pressure sensor 704, the processor 705 and the communicator 706 to operate is supplied from the vibration power generation device 701 and/or the battery 702 through the power source controller 703. The pressure sensor 704 measures the air pressure of the tire. The measurement is converted into a voltage signal. And the voltage signal is inputted to the processor 705. The signal processed by the processor 705 is inputted to the communicator 706 and propagated from the antenna 707 as a high-frequency signal.

As described above, when the vibration power generation device 701 is used as a power source of the communication device 700, decrease in the frequency of maintenance such as battery change or a condition where there is no battery change is possible.

Moreover, while a case where at least one of the vibration power generation device 701 and the battery 702 is used is shown as an example in the present embodiment, if the output power from the vibration power generation device 701 can sufficiently cover the power consumed by the pressure sensor 704, the processor 705 and the communicator 706 and the power necessary for communication, the use of only the vibration power generation device 701 is possible. In that case, the battery 702 and the power source controller 703 are unnecessary, which enables size reduction of the communication device 700.

While in the seventh embodiment, the communication device 700 with only pressure sensor 704 is described with reference to the block diagram of FIG. 12, a similar effect can be obtained with a communication device provided with a sensor and a control circuit for controlling power by detecting the operating condition of the vehicle.

Further, while the use of the vibration power generator disclosed in the first embodiment to the fourth embodiment is shown as an example in the seventh embodiment, a similar effect can be obtained when a different vibration power generator capable of converting external vibration into power is used.

Eighth Embodiment

Figure 13:
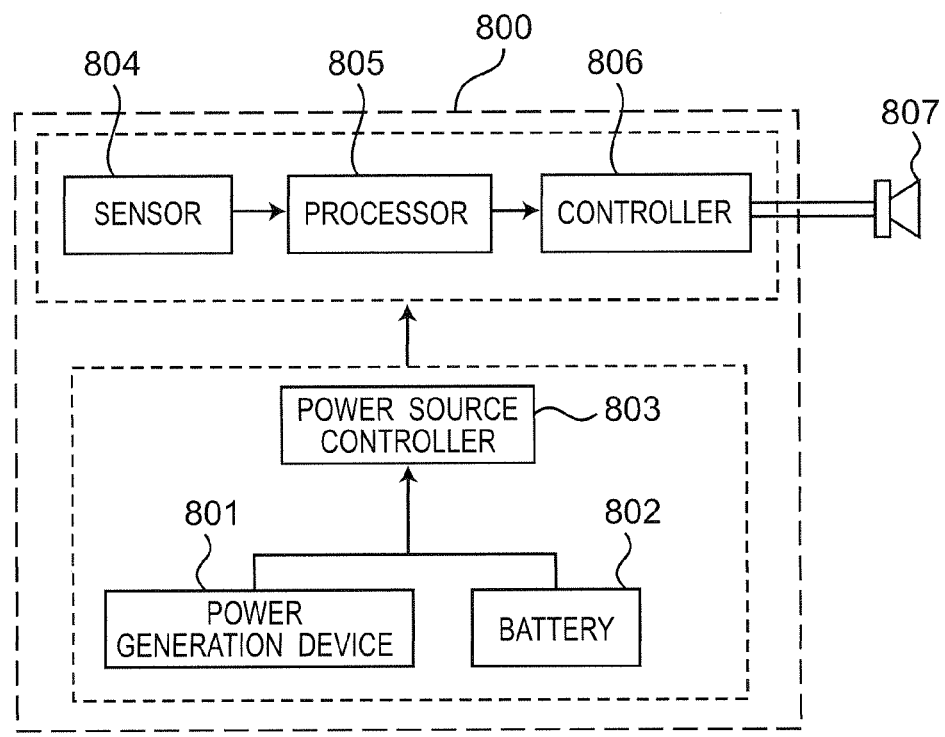
FIG. 13 is a block diagram of an electronic equipment having a vibration power generation device according to an eighth embodiment of the present disclosure.
Figure 14:
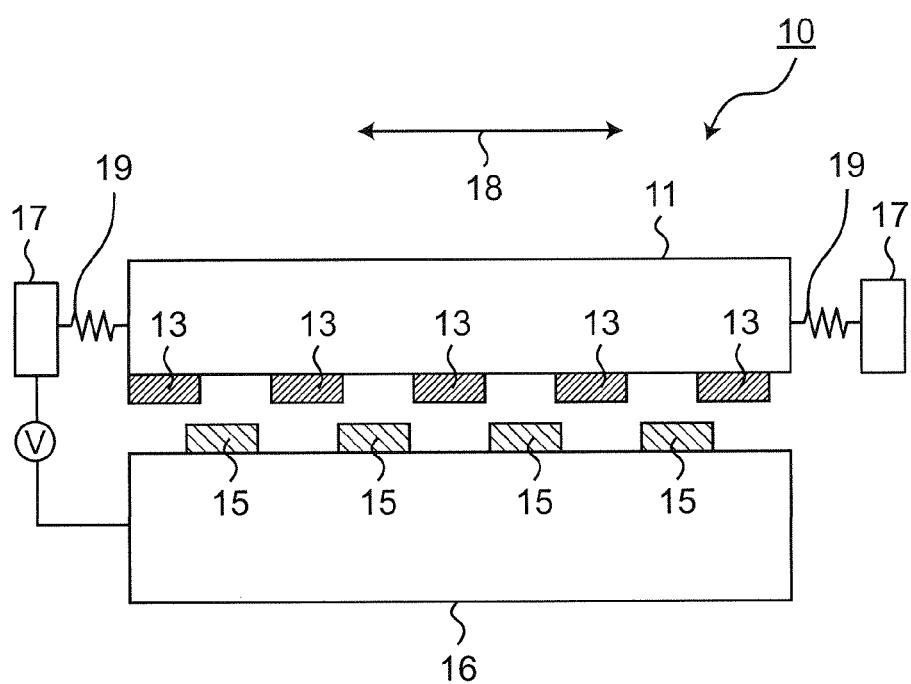
FIG. 14 is a schematic cross-sectional view of the electrostatic induction vibration power generator according to the prior art.
Figure 15:
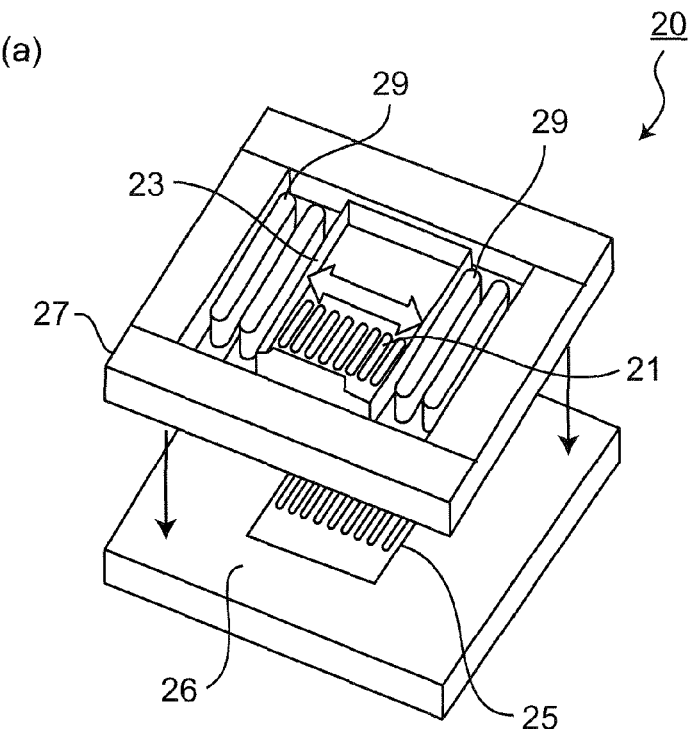
FIG. 15 is a perspective view of the electrostatic induction vibration power generator according to the other prior art.
Figure 15:
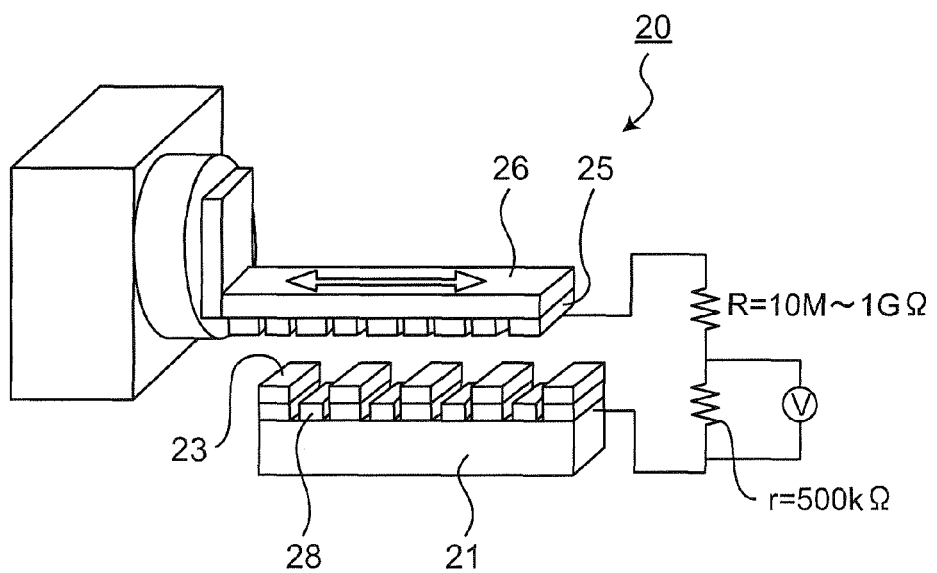

FIG. 13 is a block diagram of a sound producing electronic equipment 800 mounted on a toy or the like. In FIG. 13, a vibration power generation device 801 is the one disclosed in the sixth embodiment.

The electronic equipment 800 shown in FIG. 13 is provided with a vibration power generation device 801, a battery 802, a power source controller 803, a sensor 804, a processor 805, a controller 806, and a speaker 807. The vibration power generation device 801 generates power by vibration. The battery 802 functions as the main power source of the electronic equipment 800 or as the sub power source of the vibration power generation device 801. The power source controller 803 switches between the output from the vibration power generation device 801 and the output from the battery 802, and supplies the output to the circuit. The sensor 804 detects an external input (for example, button push or inclination). The processor 805 processes the output from the sensor 804 and transmits it to the controller 806. The controller 806 transmits the output signal to the speaker 807 by the input signal from the processor 805. The speaker 807 outputs sound.

The operation of the electronic equipment 800 configured as described above will be described.

The power necessary for the sensor 804, the processor 805 and the controller 806 to operate is supplied from the vibration power generation device 801 and/or the battery 802 through the power source controller 803. The sensor 804 detects an external input, and inputs the detection result to the processor 805. When the signal processed by the processor 805 exceeds a desired value, it is inputted to the controller 806 to make sound from the speaker 807.

As described above, when the vibration power generation device 801 is used as a power source of the electronic equipment 800, decrease in the frequency of maintenance such as battery change or a condition where there is no battery change is possible.

Moreover, while a case where at least one of the vibration power generation device 801 and the battery 802 is used is shown as an example in the eighth embodiment, if the output power from the vibration power generation device 801 can sufficiently cover the power consumed by the sensor 804, the processor 805 and the controller 806, the use of only the vibration power generation device 801 is possible. In that case, the battery 802 and the power source controller 803 are unnecessary, which enables size reduction of the electronic equipment 800.

While the use of the vibration power generator disclosed in the first embodiment to the fifth embodiment is shown as an example in the eighth embodiment, a similar effect can be obtained when a different vibration power generator capable of converting external vibration into power is used.

The above-described embodiments should be considered as absolutely illustrative and not restrictive. The scope of the present disclosure is indicated by the claims rather than by the foregoing description and all changes within the meaning and scope equivalent to the scope of the claims are to be embraced.

EXPLANATION OF REFERENCE NUMERALS 100 vibration power generator
101 first substrate (movable member)
102L second substrate (fixed member)
102U third substrate
109a first electrode
109b second electrode
109c third electrode
109d fourth electrode
107 switching element
110 part involved in power generation
218 position detection circuit
500 vibration power generation device
600 vibration power generation device
700 communication device
800 electronic equipment

The invention claimed is:

1. A vibration power generator comprising: a first substrate and a second substrate configured so as to be relatively movable while keeping a condition of being separated so as to be opposed to each other;
a first electrode formed on the first substrate;
a second electrode formed on the second substrate so as to be opposed to the first electrode; and
a third electrode formed in a region different from the first electrode on the first substrate,
wherein either one of the first electrode and the second electrode includes a film holding a charge, and
when an overlap between the first electrode and the second electrode is minimum, the third electrode is grounded, and when the overlap between the first electrode and the second electrode is maximum, the third electrode is open.

2. The vibration power generator according to claim 1, further comprising a position detection circuit that detects a condition of the overlap between the first electrode and the second electrode,
wherein when an output voltage signal from the position detection circuit exceeds a desired threshold value, the third electrode is connected to GND.

3. The vibration power generator according to claim 2, further comprising a switching element that switches a condition of the third electrode,
wherein one end of the switching element is connected to the third electrode, and another end of the switching element is set at GND, and
the position detection circuit is connected to the second electrode.

4. The vibration power generator according to claim 2, further comprising: a switching element that switches a condition of the third electrode; and
a fourth electrode formed in a region different from the second electrode on the second substrate,
wherein one end of the switching element is connected to the third electrode, and another end of the switching element is set at GND, and
the position detection circuit is connected to the fourth electrode.

5. A vibration power generation device comprising: the vibration power generator according to claim 1;
a rectification circuit that rectifies an AC output voltage from the vibration power generator to convert it into a DC voltage;
a voltage conversion circuit that coverts the DC voltage outputted from the rectification circuit, to a desired voltage level;
an electric storage circuit that stores power generated by the vibration power generator when the output from the vibration power generator is unnecessary;
a voltage control circuit that controls an output voltage from the voltage conversion circuit or from the electric storage circuit to a predetermined voltage; and
an output switching circuit that switches an output from the voltage conversion circuit to the electric storage circuit or to the voltage control circuit.

6. A vibration power generation device comprising: the vibration power generator according to claim 1;
a rectification circuit that rectifies an AC output voltage from the vibration power generator to convert it into a DC voltage;
a voltage conversion circuit that converts a DC voltage outputted from the rectification circuit, to a desired voltage level and outputs it to an electric storage circuit; and
an output control circuit that outputs power stored in the electric storage circuit.

7. A communication device using the vibration power generation device according to claim 6.

8. A communication device having the vibration power generator according to claim 1 and a battery.

9. An electronic equipment using the vibration power generation device according to claim 6.

10. An electronic equipment having the vibration power generator according to claim 1 and a battery.

* * * * *